United States Patent [19]

Wainwright

[11] Patent Number: 4,900,996
[45] Date of Patent: Feb. 13, 1990

[54] VEHICLE WINDOW WIPERS WITH DYNAMIC SYMMETRICAL OVERLAP

[75] Inventor: Richard E. Wainwright, Kettering, Ohio

[73] Assignee: General Motors Corporation, Detroit, Mich.

[21] Appl. No.: 371,157

[22] Filed: Jun. 26, 1989

[51] Int. Cl.$^4$ .............................................. B60S 1/08
[52] U.S. Cl. ...................... 318/443; 318/54; 318/102; 318/DIG. 2
[58] Field of Search ............... 318/35, 41, 49, 53, 318/54, 65, 85, 101, 102, 443, 444, DIG. 2

[56] References Cited

U.S. PATENT DOCUMENTS

| | | |
|---|---|---|
| 3,049,742 | 8/1962 | Kato et al. . |
| 3,721,878 | 3/1973 | Gumbert .............................. 318/443 |
| 4,405,887 | 9/1983 | Tamura et al. ....................... 318/443 |
| 4,431,954 | 2/1984 | Carpenter et al. . |
| 4,492,904 | 1/1985 | Graham ............................... 318/444 |
| 4,585,980 | 4/1986 | Gille et al. ....................... 318/443 X |
| 4,665,488 | 5/1987 | Graham et al. . |
| 4,670,695 | 6/1987 | Licata et al. ........................ 318/443 |
| 4,723,101 | 2/1988 | Bauer et al. . |

Primary Examiner—Betsu Ro
Attorney, Agent, or Firm—Robert M. Sigler

[57] ABSTRACT

A pair of wiper blades on a vehicle window are oscillated in opposing movement between an overlapping inner wipe arrangement, in which one of the blades overlaps the other, and separated outer wiper positions. In dynamic symmetrical overlap (DSOL) operation, the first blade during each cycle to reach its outer wipe position is brought back first to be overlapped by the other for the start of the next cycle. This will normally produce alternating symmetrical overlap (ASOL) operation with its advantages of lower maximum blade acceleration and stress, since the overlapping blade precedes the other on the way out. However, if the leading blade is occasionally slowed, the other blade will not be forced to wait in its outer wipe position; and the cycle time will be minimized.

6 Claims, 5 Drawing Sheets

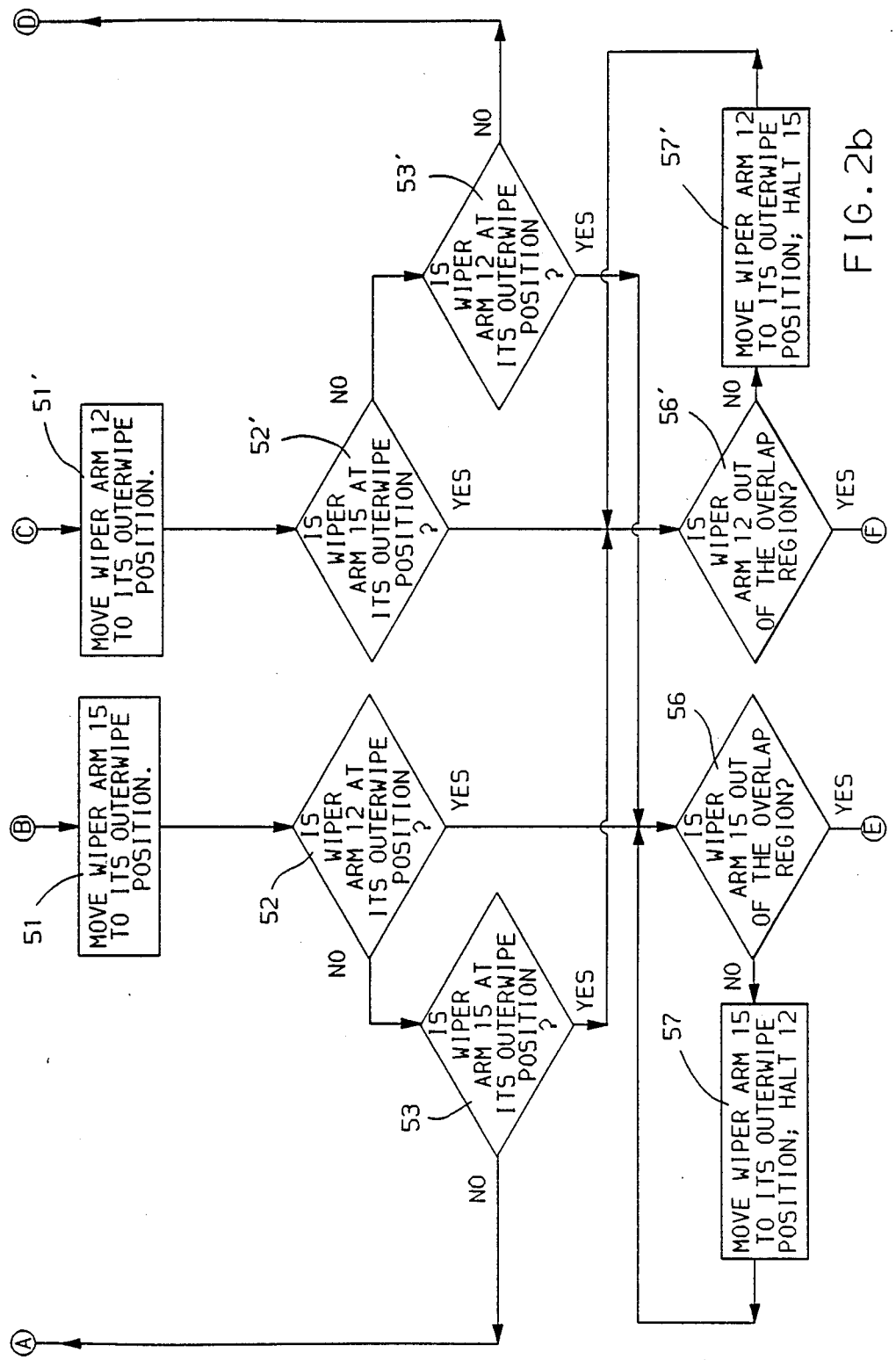

VEHICLE WINDOW WIPERS WITH DYNAMIC SYMMETRICAL OVERLAP

BACKGROUND OF THE INVENTION

Improved aerodynamics for motor vehicles are leading to future windshield designs with more pronounced rake angles, which produce a larger window surface. A window wiper system for such windshields must therefore include longer, more massive wiper arms and blades to wipe the required percentage of the larger surface. In a symmetrical overlap wipe pattern, in which the blades are oscillated in opposing movement between separated outer wipe positions and an overlapping inner wipe arrangement, longer arms and blades produce a larger overlap or collision avoidance region and, consequently, a need for increased blade separation.

Present symmetrical overlap wiper systems use a single motor with an unbalanced linkage to move the wiper blades through a repeating pattern, with one of the blades always overlapping the other in an overlapping inner wipe arrangement. The overlapping blade leads the other from the overlapping inner wipe arrangement through the overlap region toward its outer wipe position and follows the other back through the overlap region into the overlapping inner wipe arrangement. It must therefore pause at its outer wipe position to allow the other blade time to reach its outer wipe position and return to precede it back into the overlap region. When the paused blade is restarted, it must be rapidly accelerated to make up for the time lost in the pause in order to achieve high wipe rates such as 75 wipes per minute; and this rapid acceleration of a large mass puts extra stress on the linkage components and may lead to an undesired whipping action of the blade ends.

A variation of the symmetrical overlap pattern described above is the alternating symmetrical overlap pattern, in which the upper blade in the overlapping inner wipe arrangement is alternated in each cycle. In this pattern, the first blade out no longer has to wait while the other blade reaches its outer wipe position but starts back without pause, providing, as will normally be the case, that the other blade has cleared the overlap region. With no requirement for a long pause in the outer wipe position, the blade does not need to be accelerated to such a great degree in its return. The alternating symmetrical overlap system of this invention thus significantly reduces stress on arms, blades and linkages and reduces blade end whip at high wipe cycle rates.

However, in an alternating symmetrical overlap wiper system, the leading wiper blade moving outward to its outer wipe position may be slowed down by different motor speed or glass conditions so that the following blade is the first to reach an outer wipe position. If this occurs, the wipe cycle may be completed sooner by allowing this following blade to immediately reverse and precede the slowed blade back toward the overlapping inner wipe arrangement.

SUMMARY OF THE INVENTION

This invention, therefore, provides for a vehicle window wiper in which the advantages of alternating symmetrical overlap operation are obtained when possible but wipe cycle rates are maximized. In this dynamic symmetrical overlap (DSOL) window wiper system, the wiper blades are repeatedly cycled in opposing movement through wipe areas between separate outer wipe positions and an overlapping inner wipe arrangement in which one of the wipers overlaps the other. However, in each wipe cycle, the first wiper blade to reach its outer wipe position leads the other wiper blade back into the overlapping inner wipe arrangement to be overlapped thereby and become the following blade outward in the next cycle.

With proper system design, this DSOL wiper system will normally produce alternating symmetrical overlap (ASOL) operation with its advantages in reducing maximum accelerations of wiper arms and blades with consequent reduction in stress on mechanical wiper components and tendency for whipping of wiper blade ends. However, if a leading blade is occasionally slowed, the DSOL system will automatically minimize cycle time for maximum wipe rate. Further details and advantages of this invention will be apparent from the accompanying drawings and following description of a preferred embodiment.

SUMMARY OF THE DRAWINGS

FIGS. 2a, 2b, 3a and 3b are flow charts describing the method of the invention by the apparatus of FIG. 1.

DESCRIPTION OF THE PREFERRED EMBODIMENT

Figure 1:
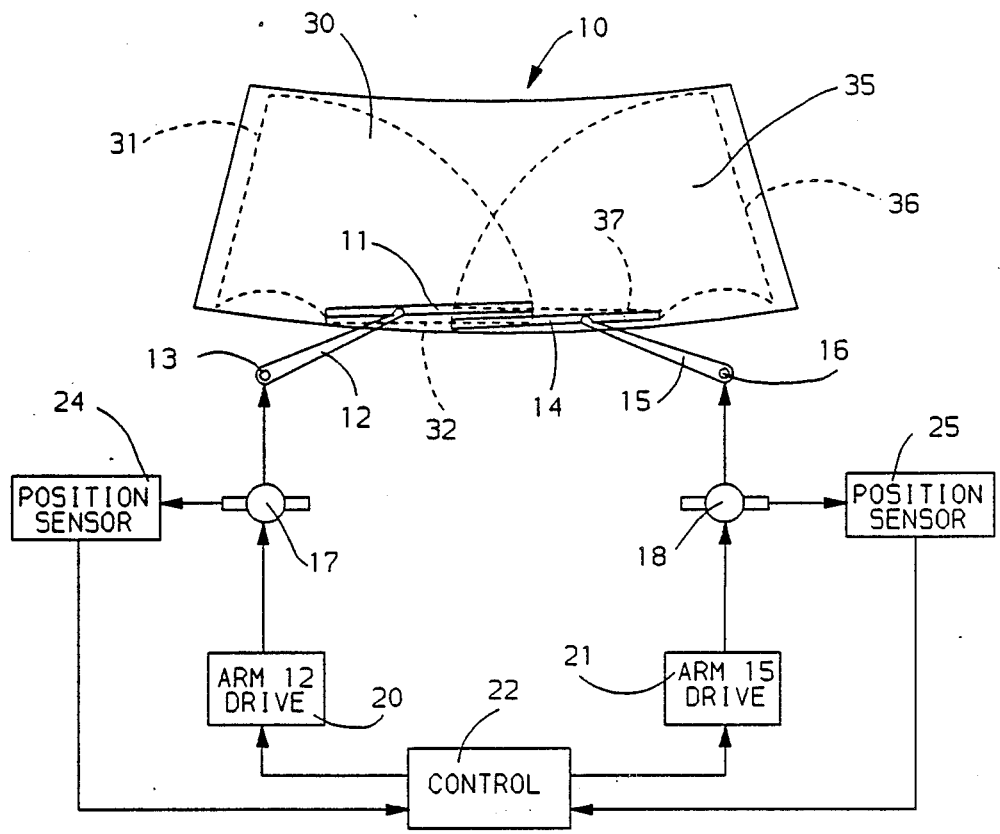
FIG. 1 is a schematic diagram of a wiper system embodying the invention.

Referring to FIG. 1, a motor vehicle window such as windshield 10 includes a wiper blade 11 carried by an arm 12 pivoted on a shaft 13 below windshield 10 and a wiper blade 14 carried by an arm 15 pivoted on a shaft 16 below windshield 10. For purposes of this application, it makes no difference which of blades 11 and 14 is on the driver side and which is on the passenger side of the vehicle. Shaft 13 is turned by an electric motor 17; and shaft 16 is turned by a separate electric motor 18. Motors 17 and 18 may be permanent magnet DC motors, shown with two brushes although three brush motors could be used, and may drive shafts 13 and 16 through reduction gearing. The separate motors 17 and 18 provide independent control of the wiper blades 11 and 14 for the practice of this invention.

Motors 17 and 18 are powered by motor drive units 20 and 21, respectively, which are controlled by a control unit 22. Position sensors 24 and 25 are associated with wiper blades 11 and 14, respectively, to indicate the position of each and feed this information back to control 22. The position sensors may be constructed to sense the rotational positions of the armatures of motors 17 and 18, of shafts 13 and 16, or of any associated component having a position which is a single valued function of blade position. The position sensors may be, for example, potentiometer voltage dividers connected across a regulated voltage so as to generate analog voltage signals indicative of blade position. If the regulated voltage is subject to variation, it may also be provided to control 22 and used as a ratiometric reference for the blade position signals.

Control 22 may be based on a digital computer, such as the Motorola MC6805R2 (R) one chip microcomputer. This device includes on-chip CPU, RAM, ROM, clock, timer, A/D conversion, digital input and output lines, and analog input lines. Hardware connections for this computer are well known and described in the Motorola Microprocessors Data Manual, available from Motorola, Inc., Austin, Tex. 78721. The computer is to be provided with a stored program in ROM to perform the invention as described below; and outputs are provided to motor drive units as described in U.S. Pat. No. 4,665,488, issued May 12, 1987 to Graham et al. Briefly, control 22 provides two digital outputs to each of motor drive units 20 and 21; and the drive units respond to the four possible digital combinations of the two outputs to enable four possible modes for each of motors 17 and 18: (1) motor drive in one direction, (2) motor drive in the opposite direction, (3) motor dynamically braked, and (4) motor deactivated and not braked (coasting). Motor speed selection may be obtained, if desired, through digital switching in duty cycle fashion to vary the average motor armature voltage. In addition to inputs from wiper position sensors 24 and 25 and the regulated supply voltage, the computer of control 22 may also receive an input from any control switches for selecting modes of wiper operation.

Wiper blades 11 and 14 are oscillated across windshield 10 through wipe areas 30 and 35, respectively. Wipe area 30 of wiper blade 11 is bounded by an outer wipe position indicated by dashed line 31 adjacent the side of the windshield and a low inner wipe position indicated by dashed line 32 adjacent the bottom of windshield 10 and further includes a high inner wipe position in which wiper blade 11 is shown in FIG. 1 and which is located just above low inner wipe position 32. In operation, blade 11 will be oscillated back and forth between its outer wipe position and, alternately, its high and low inner wipe positions. Similarly, wiper blade 14 defines a wipe area 35 bounded by an outer wipe position indicated by dashed line 36 and a low inner wipe position in which wiper blade 14 is shown in FIG. 1. A high inner wipe position for blade 14 is indicated by dashed line 37 located just above the low inner wipe position as indicated by the position of blade 14. In operation, blade 14 will be oscillated back and forth between its outer wipe position and, alternately, its high and low inner wipe positions, so that it also alternates high and low inner wipe positions with respect to blade 11.

The overlapping inner wipe arrangement thus comprises two possible inner wipe conditions: (1) blade 11 in its high inner wipe position with blade 14 in its low inner wipe position, as shown in FIG. 1; and (2) blade 11 in its low inner wipe position with blade 14 in its high inner wipe position, which is the reverse of that shown in FIG. 1. On any given DSOL wipe cycle, starting from one of the inner wipe conditions, both blades are driven upward toward their outer wipe positions, with the lower blade (starting from its low inner wipe position) maintained at least a predetermined distance behind the upper blade (starting from its high inner wipe position) through the overlap region. The first of the upper and lower blades to reach its outer wipe position is detected; and, when the other blade has cleared the overlap region, the first detected blade to reach its outer wipe position is driven back toward its low inner wipe position and becomes the lower blade.

Normally, the upper blade in outward movement will first reach its outer wipe position; and alternating symmetrical overlap (ASOL) operation will effectively be obtained. However, in strict ASOL operation the upper blade in outward movement is also the leading blade in downward movement. Therefore, if this blade is slowed so that the other blade first reaches its outer wipe position, that other blade would be held for the slowed blade; and the time of the wipe cycle would be increased with consequent slowing of the wipe rate. In DSOL operation, if the lower or following blade in outward movement first reaches its outer wipe position, it is reversed immediately and becomes the leading blade in movement back to the overlapping inner wipe position, in which it becomes the lower blade once again. The lower blade will normally clear the overlap region in outward movement before the upper blade reaches its outer wipe position; and the upper blade may then normally reverse immediately with no pause to begin its return. The slowed upper blade, when it reaches its outer wipe position, is reversed but remains the upper blade, driven back down to its high inner wipe position while being maintained at least a predetermined distance behind the now lower blade, at least through the overlap region. The cycle repeats until it is stopped by the operator, with the blades alternating high and low inner wipe positions.

Figure 2A:
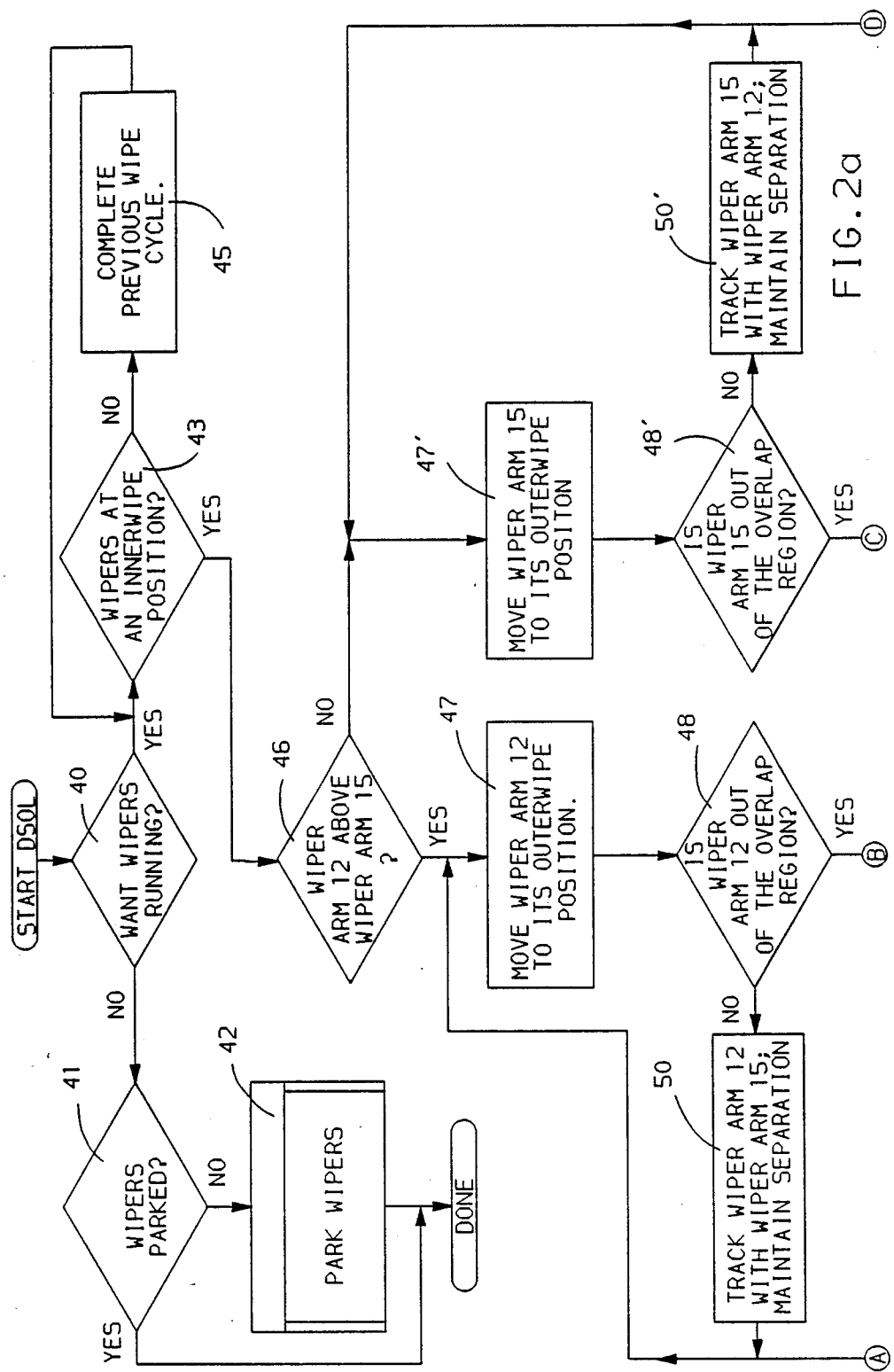

The operation is described in more detail with reference to FIGS. 2a, 2b, 3a and 3b, which describe the programming of control 22 in flow chart form. Throughout this description, the term wiper arm 12 refers also to wiper blade 11 and the term wiper arm 15 refers also to wiper blade 14, since the arms and blades move together. The term "arm" is used rather than the term "blade" simply because it fits into the flow chart easier. Referring to FIG. 2a, the DSOL routine starts by asking, at decision point 40, if the wipers should be running. If not, as would be the case if a main wiper control switch were in its OFF condition, the routine asks, at decision point 41, if the wipers are to be parked. If they are, the routine is exited. If not, a wiper park subroutine 42 is performed before exit. If, at decision block 40, the wipers are to be running, as indicated by a main wiper control switch, the routine asks at decision point 43 if both wiper blades are at inner wipe positions. If not, the previous cycle will be completed at step 45 to bring wiper blades 11 and 14 back to high and low inner wipe positions. Such an occurrence is possible, for example, when the vehicle ignition was switched off at the end of a previous period of engine use with the wiper switch left in an operational condition and the wiper blades in the middle of a wipe cycle so that the blades are left on the glass within the wipe areas. Step 45 can be effective to simply determine which blade is lower and initiate return of that blade to its low inner wipe position and the return of the higher blade to its high inner wipe position, while maintaining a minimum blade separation through the overlap region. From step 45, the routine returns to decision point 43 so as to continue the operation until both wipers are at their targeted inner wipe positions. The wiper parking subroutine may operate in a similar manner.

From decision point 43, if both wipers are at inner wipe positions, the routine asks, at decision point 46, which wiper arm (or blade) is higher. If it is wiper arm 12, the routine acts, at step 47, to move wiper arm 12 toward its outer wipe position. At decision point 48, the routine then asks if wiper arm 12 is out of the overlap region. If it is not, the routine, at step 50, continues to move wiper arm 12 to its outer wipe position but also starts wiper arm 15 toward its outer wipe position while tracking its progress with that of wiper arm 12 to maintain a predetermined minimum separation. The routine loops from step 50 back to step 47. From decision point 48, once wiper arm 12 is out of the overlap region, the routine proceeds to step 51, in FIG. 2b, in which it causes wiper arm 15 to move freely toward its outer wipe position. Since wiper arm 12 is out of the overlap region, there is no possibility of collision. From step 51, the routine asks, at decision point 52, if wiper arm 12 has reached its outer wipe position. If not, the routine asks, at decision pint 53, if wiper arm 15 has reached its outer wipe position. If not, the routine loops back to step 47.

The possibility that arm 15 will be the first to reach its outer wipe position will be postponed to a later point in this description. Once wiper arm 12 has reached its outer wipe position, as determined at decision point 52, the routine asks, at decision point 56, if wiper arm 15 has cleared the overlap region. If not, wiper arm 12 is halted at its outer wipe position in step 57; and wiper arm 15 continues to move toward its outer wipe position, with the routine looping back to decision point 56. In normal operation, however, step 57 will be not be reached; and wiper arm 12 will be reversed without pause.

Figure 3B:
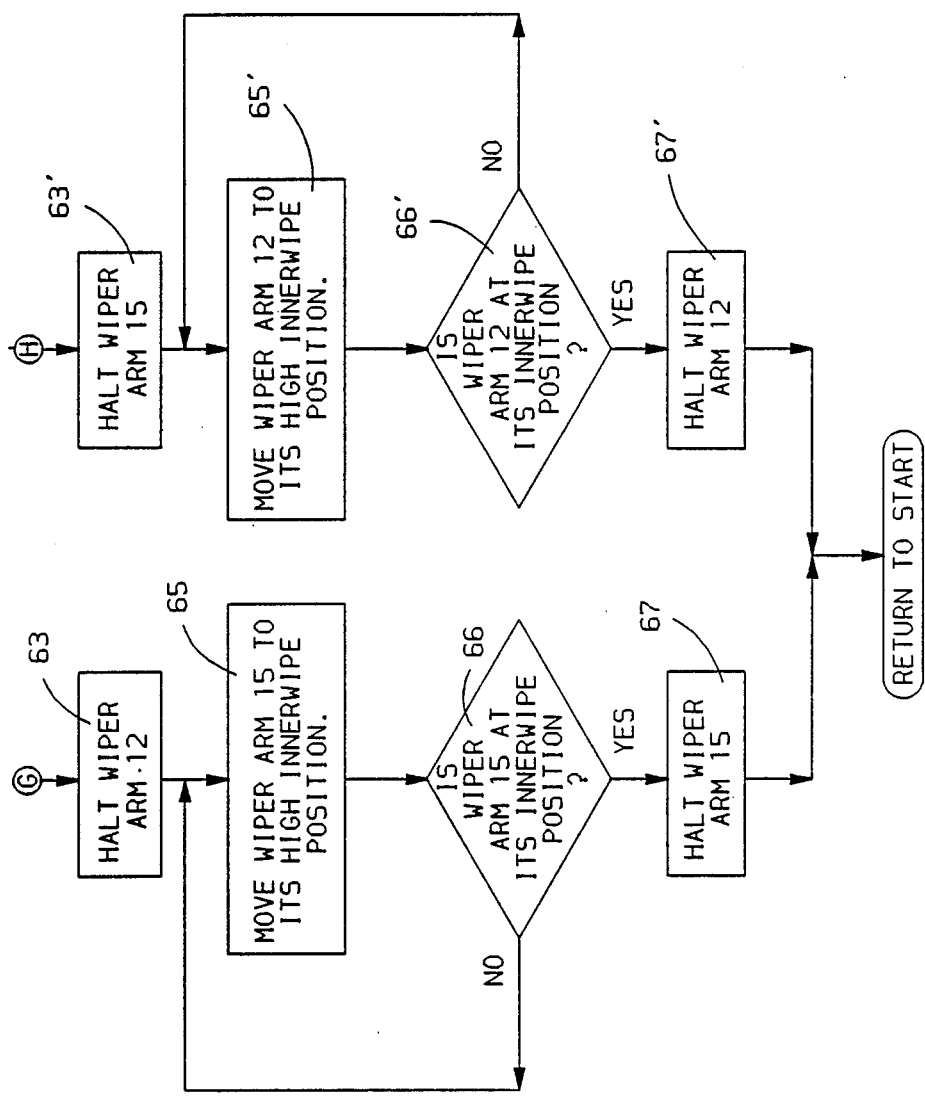
Figure 3A:
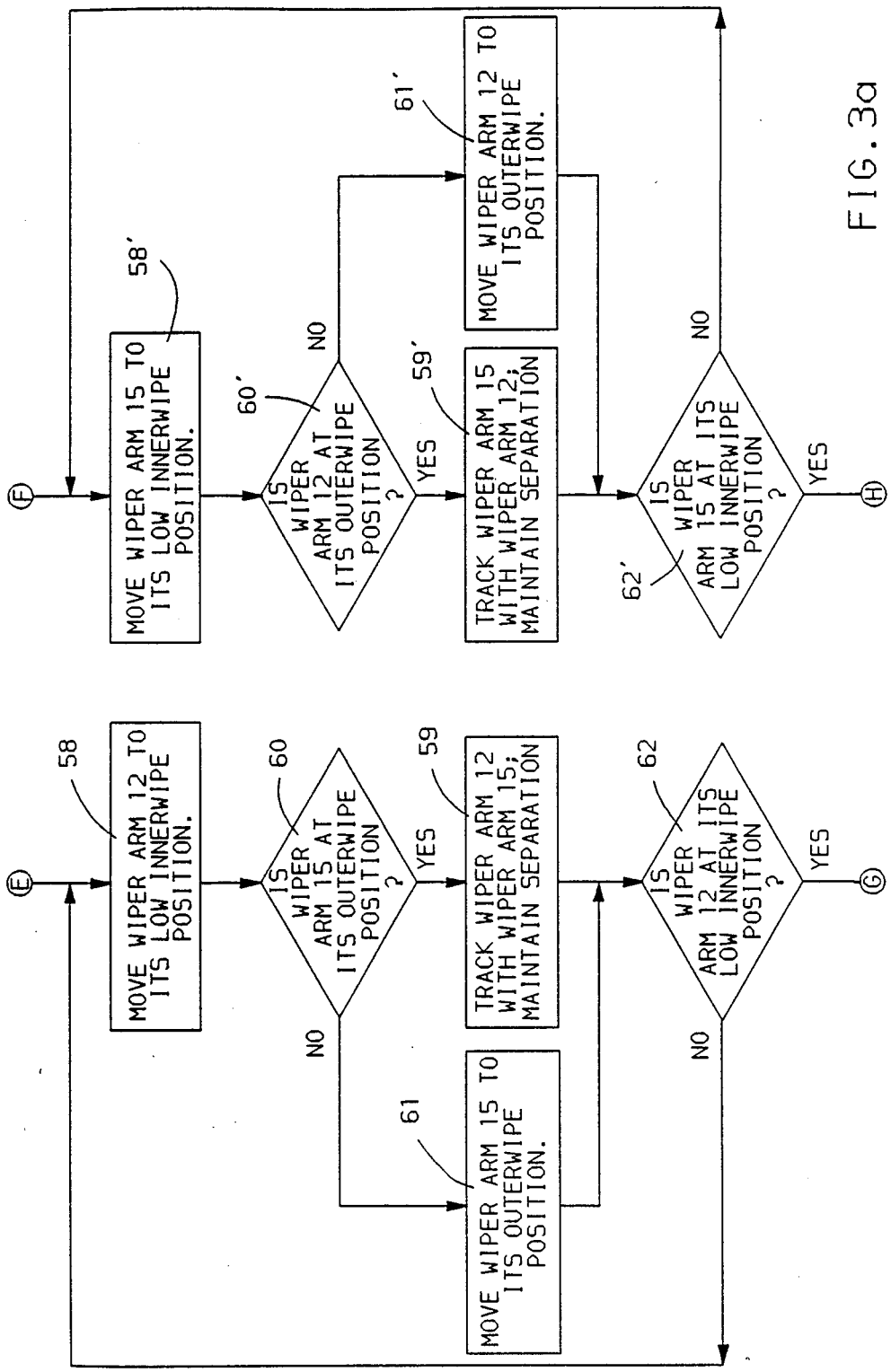

When, at decision point 56, wiper arm 15 is determined to be out of the overlap region, the routine proceeds to step 58, in FIG. 3a, in which it causes wiper arm 12 to be reversed and to move toward its low inner wipe position. The routine then asks, at decision point 60, if wiper arm 15 has reached its outer wipe position. If not, the routine continues to move wiper arm 15 to its outer wipe position in step 61 and asks, at decision point 62, if wiper arm 12 has reached its low inner wipe position. If it has not, the routine returns to step 58. From decision point 60, if wiper arm 15 is at its outer wipe position, the routine reverses the direction of wiper arm 15 in step 59 and causes it to be driven back toward its high inner wipe position while tracking wiper arm 12 behind it to maintain a predetermined minimum separation.

When, at decision point 62, wiper arm 12 reaches its low inner wipe position, the routine next halts wiper arm 12 in step 63 of FIG. 3b and continues moving wiper arm 15 back to its high inner wipe position in step 65. At decision point 66, the routine asks if wiper arm 15 has reached its high inner wipe position. If not, the routine loops back to step 65; if so, the routine halts wiper arm 15 in step 67 and returns to the start of the routine.

From decision point 46, if the routine had determined that wiper arm 15 was above wiper arm 12, a similar flow chart would have been traveled, but with references to wiper arms 12 and 15 reversed. Thus, in FIGS. 2a, 2b, 3a and 3b, this "mirror image" flow chart includes elements with primed numerals similar to the matching elements already described. There is no need to describe these primed numeral elements in detail, since they are similar in function to the unprimed elements of similar number, but with reversal of arms 12 and 15.

However, it is now appropriate to describe the flow chart when, at decision point 53, it is determined that wiper arm 15, which is the lower arm following wiper arm 12 in outward movement, is the first to reach its outer wipe position (with wiper arm 12 not yet having reached its outer wipe position). From decision point 53, in this circumstance, the routine crosses over to the primed side of the flow chart— to decision point 56' — and proceeds as indicated. Likewise, from decision point 53', if wiper arm 12 has reached its outer wipe position with wiper arm 15 not yet having reached its outer wipe position, the routine proceeds to the unprimed side of the flow chart at decision point 56.

This embodiment of the method will be seen to have error recovery built in, in case the lower wiper blades encounters an obstacle moving out which slows it down or stops it clear of the overlap region. For example, assume the routine is looping around elements 58, 60, 61 and 62 in FIG. 3a, with wiper arm 12 moving smoothly back to its low inner wipe position and with wiper arm 15 clear of the overlap region but unable to overcome an obstacle on its way out to its outer wipe position. When wiper arm 12 finally reaches its low inner wipe position and is halted at step 63, wiper arm 15 will be reversed from wherever it is stopped to return to its high inner wipe position so the next wipe cycle can begin with the wipers reversed in inner wipe positions according to the invention.

For those steps in the flow charts in which it is indicated that one of the arms is tracked with the other to maintain a predetermined minimum separation, the action involves comparing the position sensor readings of the two arms or blades. If the comparison shows the following blade position encroaching on that minimum separation, the motor for the following blade may be turned off or its duty cycle decreased. In addition, or alternatively, the duty cycle of the leading blade could be increased. In either case, the separation should increase. The reverse is true if the separation as so measured becomes greater than some higher predetermined separation.

The embodiments of the invention in which an exclusive property or privilege is claimed are defined as follows:

1. A method of operating a pair of wiper blades on a vehicle window comprising the steps:
    oscillating the wiper blades in repeating cycles of opposing movement through overlapping wipe areas on the window between separated outer wipe positions and an overlapping inner wipe position in which an upper one of the wiper blades overlaps a lower one of the wiper blades, with the upper one of the wiper blades preceding the lower one of the wiper blades, in movement away from the overlapping inner wipe position;
    determining, in each successive cycle, which of the wiper blades first reaches its outer wipe position; and
    moving the first of the wiper blades to reach its outer wipe position ahead of the other of the wiper blades back into the overlapping inner wipe position to become the lower one of the wiper blades so that, in each of a series of successive cycles, the upper one of the wiper blades which overlaps and precedes the lower one of the wiper blades out of the overlapping inner wipe position is the latter of the wiper blades to reach its outer wipe position in the immediately preceding cycle.

2. The method of claim 1 in which the overlapping wipe areas define an overlap region in which the wiper blades could collide and in which the wiper blades are maintained a predetermined distance apart at least through the overlap region.

3. The method of claim 1 in which each of the wipe areas and wiper blades defines a high inner wipe position and a low inner wipe position and the overlapping inner wipe position comprises one of the wiper blades in its high inner wipe position and the other of the wiper blades in its low inner wipe position, the method comprising, in each successive cycle, moving the wiper blade which first reaches its outer wipe position back to its low inner wipe position.

4. A method of operating first and second wiper blades on a vehicle window through wipe areas between separated outer wipe positions and overlapping low inner wipe positions, the wipe areas further defining overlapping high inner wipe positions and an overlap region in which the wiper blades could collide, the method comprising the steps:

with the first wiper blade starting from its high inner wipe position and the second wiper blade starting from its low inner wipe position, driving the first and second wiper blades toward their outer wipe positions while maintaining the second wiper blade at least a predetermined distance behind the first wiper blade through the overlap region;

determining the one of the first and second wiper blades which first reaches its outer wipe position;

driving the one of the first and second wiper blades from its outer wipe position back to its low inner wipe position after the other of the first and second wiper blades has cleared the overlap region;

driving the other of the first and second wiper blades from its outer wipe position back to its high inner wipe position while maintaining the other of the first and second wiper blades at least a predetermined distance behind the one of the first and second wiper blades through the overlap region.

5. A window cleaning apparatus for a vehicle window comprising a pair of wiper blades carried by arms with separate motor drive apparatus for each arm adapted to move the associated wiper blade through a wipe area on the window between an outer wipe position and a selected one of a high inner wipe position and a low inner wipe position, each motor drive apparatus including a wiper position sensor, the window cleaning apparatus further comprising a motor drive control adapted to oscillate the wiper blades in repeating cycles of opposing movement through the wipe areas, the motor drive control being responsive to the wiper position sensors to determine in each cycle the one of the wiper blades that first reaches its outer wipe position and to move the one of the wiper blades to its low inner wipe position and the other of the wiper blades to its high inner wipe position.

6. The window cleaning apparatus of claim 5 in which the wipe areas define an overlap region in which the wiper blades could collide, the motor drive apparatus being further responsive to the wiper position sensors to maintain a predetermined separation between the wiper blades at least through the overlap region.

* * * * *